UNITED STATES PATENT OFFICE.

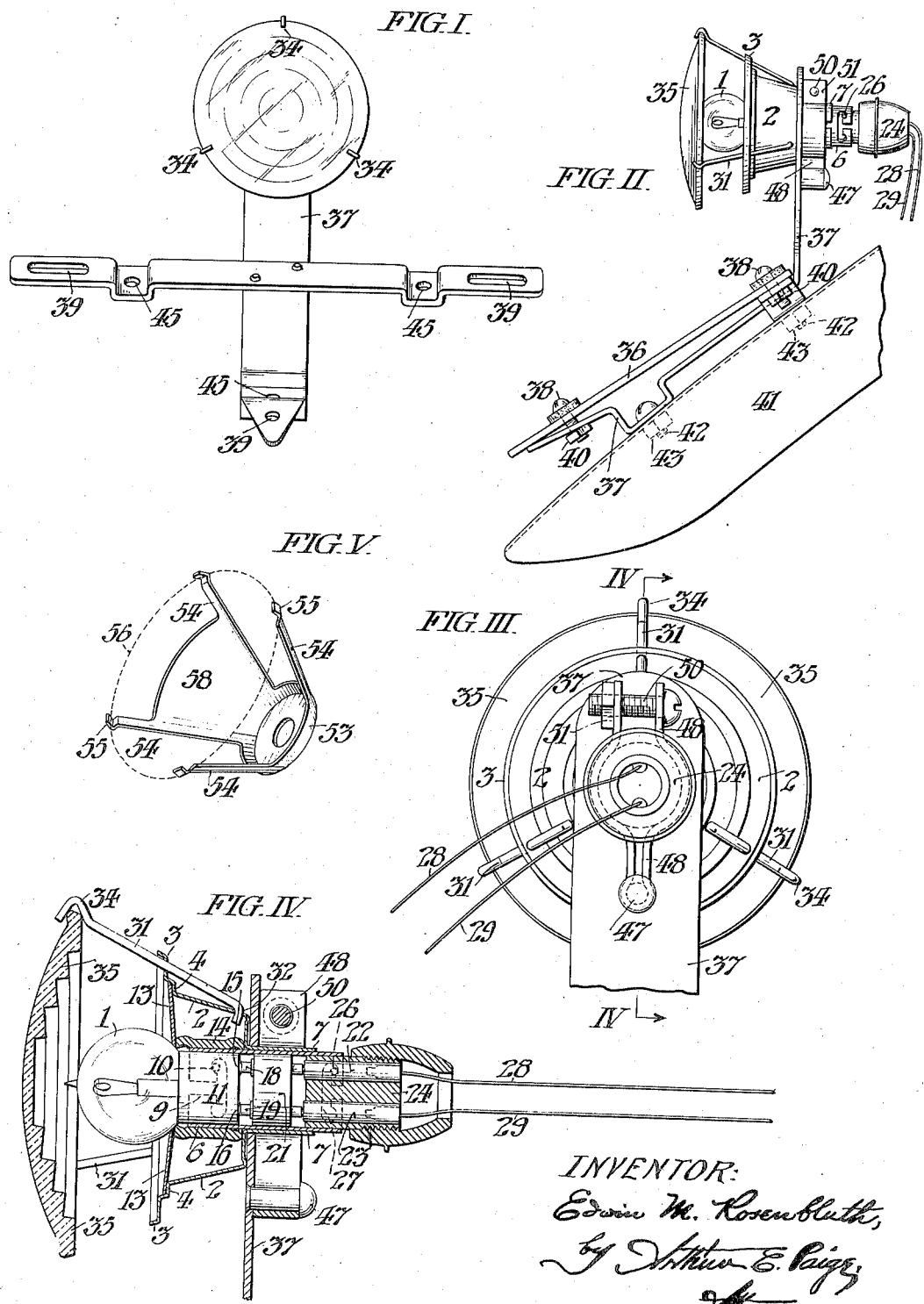

EDWIN M. ROSENBLUTH, OF PHILADELPHIA, PENNSYLVANIA.

VEHICLE-LAMP.

1,275,758.　　　　　Specification of Letters Patent.　　Patented Aug. 13, 1918.

Application filed August 16, 1917. Serial No. 186,514.

*To all whom it may concern:*

Be it known that I, EDWIN M. ROSENBLUTH, a citizen of the United States, residing at Philadelphia, in the State of Pennsylvania, have invented a certain new and useful Improvement in Vehicle-Lamps, whereof the following is a specification, reference being had to the accompanying drawings.

My invention is designed and adapted for use on a vehicle to illuminate a vehicle number plate and afford both a front and rear signal by light transmitted by a single translucent element.

As hereinafter described, my invention includes the combination with an incandescent electric lamp; of a casing for said lamp including a cup shaped shell having means arranged to detachably engage said lamp, and a series of projections adapted to detachably hold a translucent panel of colored glass, in spaced relation with said shell; whereby light from said lamp is refracted by said panel in both directions of the axis of said casing, and transversely through the space between said casing and said panel. In order to adapt said lamp for the purpose above specified, I find it convenient to mount it upon a holder having means arranged to detachably hold said casing, and means arranged to detachably hold a vehicle number plate in position to receive light transmitted transversely from said lamp by said casing and said panel.

In said drawings: Figure I is a front elevation of a lamp and appurtenances conveniently embodying my invention, including a holder for a vehicle number plate adapted to be supported by a rear wheel mud guard of a vehicle.

Fig. II is a side elevation of the structure shown in Fig. I, but connected to such a guard, and holding such a plate.

Fig. III is a rear elevation of the lamp casing and a fragment of its holder, showing the projection of the light refracting element transversely beyond said casing, so as to be visible from both the front and the rear of the latter.

Fig. IV is a longitudinal sectional view of said structure, taken on the line IV—IV in Fig. III.

Fig. V is a perspective view of a modified form of the lamp casing.

In said figures; 1 is an incandescent electric lamp mounted in the casing including the cup shaped shell 2 which has the annular flange 3 and the annular seat 4. The socket 6 in said shell, which is fitted to slide in the split tubular extension 7 of said shell, has the bayonet slot 9 adapted to engage the pin 10 on the plug 11 of said lamp 1 to detachably engage the latter in said casing. The flexible annular reflector 13, which is conveniently formed of a stamping from plane sheet celluloid, is resiliently held between said lamp 1 and said socket 6, so as to be flexed, as indicated in Fig. IV, and form a substantially tight joint with said seat 4. I find it convenient to inclose the front end of said socket 6 with a piece of soft rubber tubing 14 which is normally cylindrical but is compressed, and consequently distorted to the form shown in Fig. IV, to form a substantially tight joint at its junction with said shell 2 and with said reflector 13.

Said lamp 1 has terminals 15 and 16 which, in the position shown in Fig. IV, contact with respective spring pressed plungers 18 and 19 which are mounted to reciprocate in the insulating block 21 which is stationary in said socket 6. Said plungers 18 and 19 are also adapted to contact with the terminals 22 and 23 which are rigidly mounted in the plug 24 which is detachably connected with said socket 6 by the engagement of its pin 26 in the bayonet slot 27 in said socket. Said terminals 22 and 23 are respectively connected with the electric conductors 28 and 29 through which said lamp 1 may be energized from any suitable source. It may be observed that said plug 24 may be turned to present its pin 26 at the end of the slot 27 opposite to that in which it is shown in Fig. IV, to break the lighting circuit without removal of said plug, and the lamp 1 may be thus lighted or extinguished by turning said plug 24.

As shown in Figs. I to IV inclusive; said shell 2 is provided with a circular series of three projections conveniently formed of cylindrical wires 31, each having one end 32 fitted in a perforation in the body of said shell, and each wire extending through a perforation in the flange 3 of said shell and having a hook 34 at its free end, to hold the translucent panel of colored glass 35 which preferably forms a "Fresnel" lens capable of refracting light from said lamp 1 in both directions of the axis of said casing 2 so as to afford both a front and rear signal. Said projections 31 hold said panel in spaced relation with said shell so that light may be transmitted from said lamp, transversely to its axis, between said shell 2 and panel 35 to illuminate the vehicle number plate 36. Said plate is conveniently supported in coöperative relation with said lamp, by the bracket 37, shown in Figs. I and II, with which said plate is conveniently connected by the bolts 38 which extend through the holes 39 in said bracket and are engaged by the nuts 40. I find it convenient to support said bracket 37 upon a rear wheel mud guard 41, of the vehicle, by the bolts 42 and nuts 43 indicated in Fig. II, which bolts extend through the holes 45 in said bracket 37.

I found it convenient to connect the lamp casing 2 with the bracket 37 above described by securing to said bracket, by the rivet 47, the clamping band 48 arranged to embrace the split tubular extension 7 of said casing and constricted upon said socket 6 by the bolt 50 and nut 51 shown in Figs. II and III. However, such clamping means are claimed in Letters Patent of the United States 1,224,097 granted to me April 24, 1917, and it is to be understood that my present invention is not dependent upon use of such a support. For instance, I have shown in Fig. V a lamp casing 53 which is conveniently formed of pressed sheet metal having a circular series of four projections 54 respectively provided with hooks 55 for engagement with the panel 56 which is indicated by a dotted ellipse in said figure, but is, in fact, circular like the panel 35. Said casing 53 has the web 58 connecting 2 of its projections 54, serving as a shell and reflector for the lamp which is mounted in said casing similar to the lamp 1 aforesaid.

I find the construction of casing shown in Fig. V preferable to that shown in the other figures, for dash lamps, in that the web 58 shields the occupants of the front seat of the vehicle from the glare of the light which would otherwise be transmitted transversely to the axis of the lamp.

I do not desire to limit myself to the precise details of construction and arrangement herein set forth, as it is obvious that various modifications may be made therein without departing from the essential features of my invention as defined in the appended claims.

I claim:

1. The combination with an incandescent electric lamp; of a casing for said lamp including a cup shaped shell, having an annular flange and an annular seat; a socket in said shell having means to detachably engage said lamp; a flexible annular reflector detachably fitted between said lamp and said socket and resiliently bearing upon said shell; a circular series of projections on said shell, each consisting of a wire having one end fitted in a perforation in the body of said shell and extending through a perforation in the flange of said shell, and having a hook at its free end; a translucent panel of colored glass, forming a lens capable of refracting light in both directions of the axis of said casing, detachably engaged by said hooks, in spaced relation with said shell; said panel being of larger diameter than said shell; whereby said panel is visible in both directions of the axis of said shell to afford both a front signal and a rear signal with respect to said shell; and a holder, having means arranged to detachably hold a vehicle number plate in position to receive light transmitted transversely from said lamp between said shell and said panel.

2. The combination with an incandescent electric lamp; of a casing for said lamp including a cup shaped shell, having an annular flange and an annular seat; a socket in said shell having means to detachably engage said lamp; a flexible annular reflector detachably fitted between said lamp and said socket and resiliently bearing upon said shell; a circular series of projections on said shell, each having a hook at its free end; a translucent panel of colored glass, forming a lens capable of refracting light in both directions of the axis of said casing, detachably engaged by said hooks in spaced relation with said shell; said panel being of larger diameter than said shell; whereby said panel is visible in both directions of the axis of said shell to afford both a front signal and a rear signal with respect to said shell; and a holder, having means arranged to detachably hold a vehicle number plate in position to receive light transmitted transversely from said lamp between said shell and said panel.

3. The combination with an incandescent electric lamp; of a casing for said lamp including a cup shaped shell, having an annular flange and an annular seat; a socket in said shell having means to detachably engage said lamp; a flexible annular reflector detachably fitted between said lamp and said socket and resiliently bearing upon said shell; a circular series of projections on said shell, each consisting of a wire having one end fitted in a perforation in the body of said shell and extending through a perforation in the flange of said shell, and having a hook at its free end; and a translucent panel capable of refracting light in both directions of the axis of said casing, detachably engaged by said hooks in spaced relation with said shell; said panel being of larger diameter than said shell; whereby said panel is visible in both directions of the axis of said shell to afford both a front signal and a rear signal with respect to said shell.

4. The combination with an incandescent electric lamp; of a casing for said lamp including a cup shaped shell, having an annular flange and an annular seat; a socket in said shell having means to detachably engage said lamp; a flexible annular reflector detachably fitted between said lamp and said socket and resiliently bearing upon said shell; a circular series of projections on said shell, each having a hook at its free end; and a translucent panel capable of refracting light in both directions of the axis of said casing, detachably engaged by said hooks in spaced relation with said shell; said panel being of larger diameter than said shell; whereby said panel is visible in both directions of the axis of said shell to afford both a front signal and a rear signal with respect to said shell.

5. The combination with an incandescent electric lamp; of a casing for said lamp including a cup shaped shell, having an annular flange and an annular seat; a socket in said shell having means to detachably engage said lamp; an annular reflector detachably fitted between said lamp and said socket and bearing upon said shell; a series of projections on said shell, each having a hook at its free end; and a translucent panel capable of refracting light in both directions of the axis of said casing, detachably engaged by said hooks in spaced relation with said shell; said panel being of larger diameter than said shell; whereby said panel is visible in both directions of the axis of said shell to afford both a front signal and a rear signal with respect to said shell.

6. The combination with an incandescent electric lamp; of a casing for said lamp including a shell; a socket in said shell having means to detachably engage said lamp; a circular series of projections on said shell, each having a hook at its free end; and a translucent panel capable of refracting light in both directions of the axis of said casing, detachably engaged by said hooks, in spaced relation with said shell; said panel being of larger diameter than said shell; whereby said panel is visible in both directions with reference to the axis of said shell to afford both a front signal and a rear signal with respect to said shell.

7. The combination with an incandescent electric lamp; of a casing for said lamp including a shell; a socket in said shell having means to detachably engage said lamp; a series of projections on said shell, each having a hook at its free end; a translucent panel detachably engaged by said hooks in spaced relation with said shell; and a web forming a light shield between two of said projections.

8. The combination with an incandescent electric lamp; of a casing for said lamp including a cup shaped shell, having means to detachably engage a lamp; a series of projections on said shell, each having a hook at its free end; a translucent panel detachably engaged by said hooks in spaced relation with said shell; and a flexible reflector, flexed between said lamp and said shell; whereby light is projected from said lamp, transversely between said shell and panel.

9. The combination with an incandescent electric lamp; of a casing for said lamp including a cup shaped shell, having means to detachably engage a lamp; a series of projections on said shell, each having a hook at its free end; a translucent panel detachably engaged by said hooks in spaced relation with said shell; and a reflector, between said lamp and said shell; whereby light is projected from said lamp, transversely between said shell and panel.

In testimony whereof I have hereunto signed my name at Philadelphia, Pennsylvania, this fourteenth day of August, 1917.

EDWIN M. ROSENBLUTH.

Witnesses:
 C. C. Martin,
 E. H. Wolstenholme.